US012443940B2

(12) United States Patent
Ma et al.

(10) Patent No.: US 12,443,940 B2
(45) Date of Patent: Oct. 14, 2025

(54) SYSTEM AND METHOD FOR PROVIDING AN AUGMENTED PERSONAL MESSAGE

(71) Applicant: The Toronto-Dominion Bank, Toronto (CA)

(72) Inventors: Adrian Chung-Hey Ma, Richmond Hill (CA); Michael Pronski, Toronto (CA); Darius Braziunas, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 100 days.

(21) Appl. No.: 17/690,269

(22) Filed: Mar. 9, 2022

(65) Prior Publication Data
US 2023/0289775 A1 Sep. 14, 2023

(51) Int. Cl.
*G06Q 20/34* (2012.01)
(52) U.S. Cl.
CPC .................. *G06Q 20/351* (2013.01)
(58) Field of Classification Search
None
See application file for complete search history.

(56) References Cited

U.S. PATENT DOCUMENTS

| | | | |
|---|---|---|---|
| 8,782,536 B2 | 7/2014 | Tu | |
| 9,092,774 B2 | 7/2015 | Becorest et al. | |
| 9,576,045 B2 * | 2/2017 | Ross | G06F 16/313 |
| 10,504,140 B2 | 12/2019 | Parekh | |
| 10,547,776 B2 * | 1/2020 | Brown | G11B 27/34 |
| 11,170,364 B1 * | 11/2021 | Techel | G06Q 20/3223 |
| 12,271,746 B1 * | 4/2025 | Sardari | G06Q 20/3276 |
| 12,293,369 B2 * | 5/2025 | Koh | G06Q 20/40145 |
| 2010/0036769 A1 * | 2/2010 | Winters | G06Q 20/10 705/40 |
| 2011/0191239 A1 * | 8/2011 | Blackhurst | G06Q 30/0255 705/39 |
| 2013/0159178 A1 * | 6/2013 | Colon | G06Q 20/36 705/41 |
| 2014/0076965 A1 * | 3/2014 | Becorest | G06Q 20/342 235/375 |
| 2014/0258019 A1 * | 9/2014 | Cummins | G06Q 30/0621 705/26.5 |

(Continued)

OTHER PUBLICATIONS

D. A. Turner and K. W. Ross, "A comprehensive architecture for continuous media email," in IEEE MultiMedia, vol. 8, No. 2, pp. 88-98, Apr.-Jun. 2001 (Media). (Year: 2001).*

*Primary Examiner* — Chikaodinaka Ojiaku
(74) *Attorney, Agent, or Firm* — Rowand LLP

(57) ABSTRACT

A computer server system comprises a communications module, a processor, and memory. The processor, upon executing stored instructions, receives a request to send a stored-value card to a recipient, including a personal message and identifying an actor; generates an audio component based at least on the personal message; obtain at least one image of the actor and generate a video component by augmenting one or more features of the at least one image of the actor based on one of the personal message or the audio component; generate an augmented personal message by combining the audio component and the video component; and sends the augmented personal message to a mobile device of the recipient. The video component may be generated using at least one of image processing or one or more animation tools.

19 Claims, 13 Drawing Sheets

(56) References Cited

U.S. PATENT DOCUMENTS

| | | | |
|---|---|---|---|
| 2015/0199689 A1* | 7/2015 | Kumnick | G06Q 20/3674 |
| | | | 705/67 |
| 2017/0161781 A1* | 6/2017 | Parekh | G06Q 20/351 |
| 2017/0336927 A1* | 11/2017 | Chaudhri | G06Q 10/107 |
| 2018/0077096 A1* | 3/2018 | DeMattei | H04L 51/58 |
| 2019/0043241 A1 | 2/2019 | Scheff et al. | |
| 2021/0201295 A1 | 7/2021 | Isaacson et al. | |
| 2021/0319625 A1 | 10/2021 | Goodrich et al. | |
| 2022/0103531 A1* | 3/2022 | Dinan | G06F 21/606 |
| 2022/0261881 A1* | 8/2022 | Aslam | G06Q 30/0232 |
| 2022/0270162 A1* | 8/2022 | Sparks | G06F 3/0484 |

* cited by examiner

SYSTEM AND METHOD FOR PROVIDING AN AUGMENTED PERSONAL MESSAGE

TECHNICAL FIELD

The present application relates to systems and methods for providing an augmented personal message.

BACKGROUND

Stored-value cards may be sent to a recipient in a digital format. The stored-value cards are often presented in two-dimensions and cannot be customized for the recipient.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
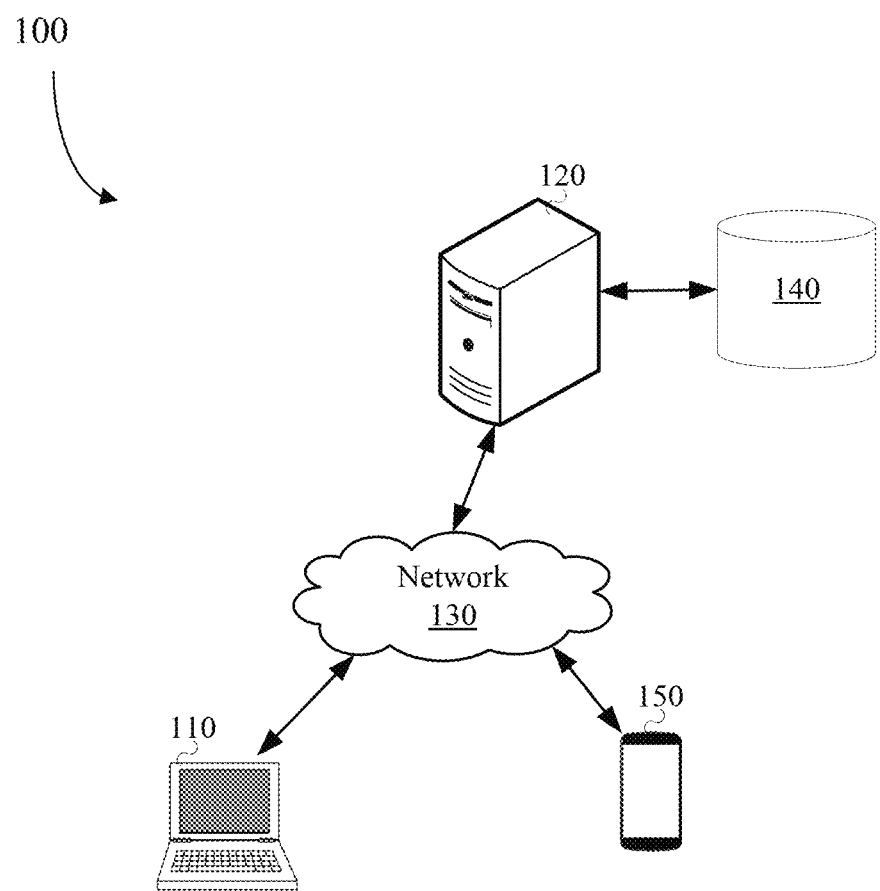
FIG. 1 is a schematic operation diagram illustrating an operating environment of an example embodiment.

Accordingly, in one aspect there is provided a computer server system comprising a communications module; a processor coupled with the communications module; and a memory coupled to the processor and storing processor-executable instructions which, when executed by the processor, configure the processor to receive, via the communications module and from a requesting device, a signal that includes a request to send a stored-value card to a recipient, the request including a personal message and identifying an actor to perform the personal message; generate an audio component based at least on the personal message; obtain at least one image of the actor and generate a video component by augmenting one or more features of the at least one image of the actor based on one of the personal message or the audio component; generate an augmented personal message by combining the audio component and the video component; and send, via the communications module and to a mobile device of the recipient, a signal that includes the augmented personal message.

In one or more embodiments, the instructions, when executed by the processor, further configure the processor to send, via the communications module and to the mobile device of the recipient, a signal that causes the mobile device of the recipient to display a selectable interface element to view the augmented personal message; and receive, via the communications module and from the mobile device of the recipient, a signal indicating selection of the selectable interface element to view the augmented personal message.

In one or more embodiments, the signal that includes the augmented personal message causes the mobile device of the recipient to play the augmented personal message in augmented reality.

In one or more embodiments, the instructions, when executed by the processor, further configure the processor to send, via the communications module and to the mobile device of the recipient, a signal that causes the mobile device to open an image capture module to capture real-time images of a real-world environment, wherein the augmented reality includes the real-time images of the real-world environment and the augmented personal message.

In one or more embodiments, the augmented personal message includes a selectable interface element to add the stored-value card to a mobile wallet and, in response to selection of the selectable interface element, the stored-value card is stored in a mobile wallet of the mobile device of the recipient.

In one or more embodiments, the selectable interface element is displayed on a display screen of the mobile device of the recipient after the augmented personal message has completed playing on the mobile device of the recipient.

In one or more embodiments, within the mobile wallet, the stored-value card includes a selectable interface element to view the augmented personal message.

In one or more embodiments, the instructions, when executed by the processor, further configure the processor to send, via the communications module and to the requesting device, a signal that causes the requesting device to display a plurality of selectable interface elements, each selectable interface element associated with a particular actor to perform the personal message.

In one or more embodiments, when generating the audio component the instructions, when executed by the processor, further configure the processor to engage a text-to-speech module to convert the personal message to the audio component.

In one or more embodiments, when generating the audio component based at least on the personal message, the instructions, when executed by the processor, further configure the processor to generate a first audio component by engaging a text-to-speech module to convert the personal message to the first audio component; obtain a second audio component from a database, the second audio component instructing a user to perform a gesture to add the stored-value card to a mobile wallet of the mobile device of the recipient; and concatenate the first audio component and the second audio component to generate the audio component.

In one or more embodiments, the instructions, when executed by the processor, further configure the processor to receive, via the communications module and from the mobile device of the recipient, a signal indicating performance of the gesture; and in response to receiving the signal indicating performance of the gesture, send, via the communications module and to the mobile device of the recipient, a signal causing the mobile device of the recipient to add the stored-value card to the mobile wallet thereof.

According to another aspect, there is provided a computer-implemented method comprising receiving, via a communications module and from a requesting device, a signal that includes a request to send a stored-value card to a recipient, the request including a personal message and identifying an actor to perform the personal message; generating an audio component based at least on the personal message; obtaining at least one image of the actor and generating a video component by augmenting one or more features of the at least one image of the actor based on one of the personal message or the audio component; generating an augmented personal message by combining the audio component and the video component; and sending, via the communications module and to a mobile device of the recipient, a signal that includes the augmented personal message.

In one or more embodiments, the method further comprises sending, via the communications module and to the mobile device of the recipient, a signal that causes the mobile device of the recipient to display a selectable interface element to view the augmented personal message; and receiving, via the communications module and from the mobile device of the recipient, a signal indicating selection of the selectable interface element to view the augmented personal message.

In one or more embodiments, the signal that includes the augmented personal message causes the mobile device of the recipient to play the augmented personal message in augmented reality.

In one or more embodiments, the method further comprises sending, via the communications module and to the mobile device of the recipient, a signal that causes the mobile device to open an image capture module to capture real-time images of a real-world environment, wherein the augmented reality includes the real-time images of the real-world environment and the augmented personal message.

In one or more embodiments, the augmented personal message includes a selectable interface element to add the stored-value card to a mobile wallet and, in response to selection of the selectable interface element, the stored-value card is stored in a mobile wallet of the mobile device of the recipient.

In one or more embodiments, the selectable interface element is displayed on a display screen of the mobile device of the recipient after the augmented personal message has completed playing on the mobile device of the recipient.

In one or more embodiments, generating the audio component based at least on the personal message comprises generating a first audio component by engaging a text-to-speech module to convert the personal message to the first audio component; obtaining a second audio component from a database, the second audio component instructing a user to perform a gesture to add the stored-value card to a mobile wallet of the mobile device of the recipient; and concatenating the first audio component and the second audio component to generate the audio component.

In one or more embodiments, the method further comprises receiving, via the communications module and from the mobile device of the recipient, a signal indicating performance of the gesture; and in response to receiving the signal indicating performance of the gesture, sending, via the communications module and to the mobile device of the recipient, a signal causing the mobile device of the recipient to add the stored-value card to the mobile wallet thereof.

According to another aspect there is provided a non-transitory computer readable storage medium comprising computer-executable instructions which, when executed, configure a processor to receive, via a communications module and from a requesting device, a signal that includes a request to send a stored-value card to a recipient, the request including a personal message and identifying an actor to perform the personal message; generate an audio component based at least on the personal message; obtain at least one image of the actor and generate a video component by augmenting one or more features of the at least one image of the actor based on one of the personal message or the audio component; generate an augmented personal message by combining the audio component and the video component; and send, via the communications module and to a mobile device of the recipient, a signal that includes the augmented personal message.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, examples involving a general-purpose computer, aspects of the disclosure transform the general-purpose computer into a special-purpose computing device when configured to execute the instructions described herein.

FIG. 1 is a schematic operation diagram illustrating an operating environment of an example embodiment. As shown, the system 100 includes a requesting device 110 and a server computer system 120 coupled to one another through a network 130, which may include a public network such as the Internet and/or a private network. The requesting device 110 and the server computer system 120 may be in geographically disparate locations. Put differently, the requesting device 110 and the server computer system 120 may be located remote from one another.

The requesting device 110 may be a computing device such as for example a laptop computer as shown in FIG. 1. However, the requesting device 110 may be a computing device of another type such as for example a smartphone, personal computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, computer servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The server computer system 120 may be associated with a stored-value card provider such as for example a financial institution server and may maintain a database 140 that includes various data records. At least some of the data records may be associated with stored-value cards. For example, a data record may store stored-value card data such as for example a type of the stored-value card, a balance of the stored-value card, an identifier of the stored-value card, a recipient of the stored-value card, etc. The type of the stored-value card may identify a particular merchant or group of merchants for the stored-value card. For example, the stored-value card may only be used or redeemed at a particular merchant. The particular merchant may be associated with the server computer system 120 or may not be associated with the server computer system 120. Put another way, the server computer system 120 may be associated with a financial institution and the financial institution may offer a number of different types of stored-value cards, where each type of stored-value card may be associated with a particular merchant.

In one or more embodiments, the database 140 may additionally include data records that may be associated with customer bank accounts and/or customer credit card accounts. For example, a data record may reflect an amount of value stored in a customer's bank account. As another example, a data record may store transaction data associated with one or more transactions made on a credit card. At least some of the data records may include additional account data such as for example the name, age, address of the customer, etc. and the account data may be associated with the customer bank accounts and/or customer credit card accounts.

The system 100 additionally includes at least one mobile device 150 and the mobile device 150 may be associated with a recipient. The mobile device 150 may be, for example, a smartphone, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The mobile device 150 may be adapted to present augmented reality environments, a specialized form of virtual reality in which graphic objects in a virtual-reality environment are related to objects in a real-world scene or environment and are presented in real-time as the real-world environment is captured using an image capture module.

As will be described, the requesting device 110 may be adapted to send, to the server computer system 120, a signal that includes a request to send a stored-value card to a recipient, the request including a personal message and identifying an actor to perform the personal message. In response, the server computer system 120 may generate the stored-value card and an augmented personal message and may send the augmented personal message to the mobile device 150 of the recipient for display. The augmented personal message may be displayed in augmented reality.

Figure 2:
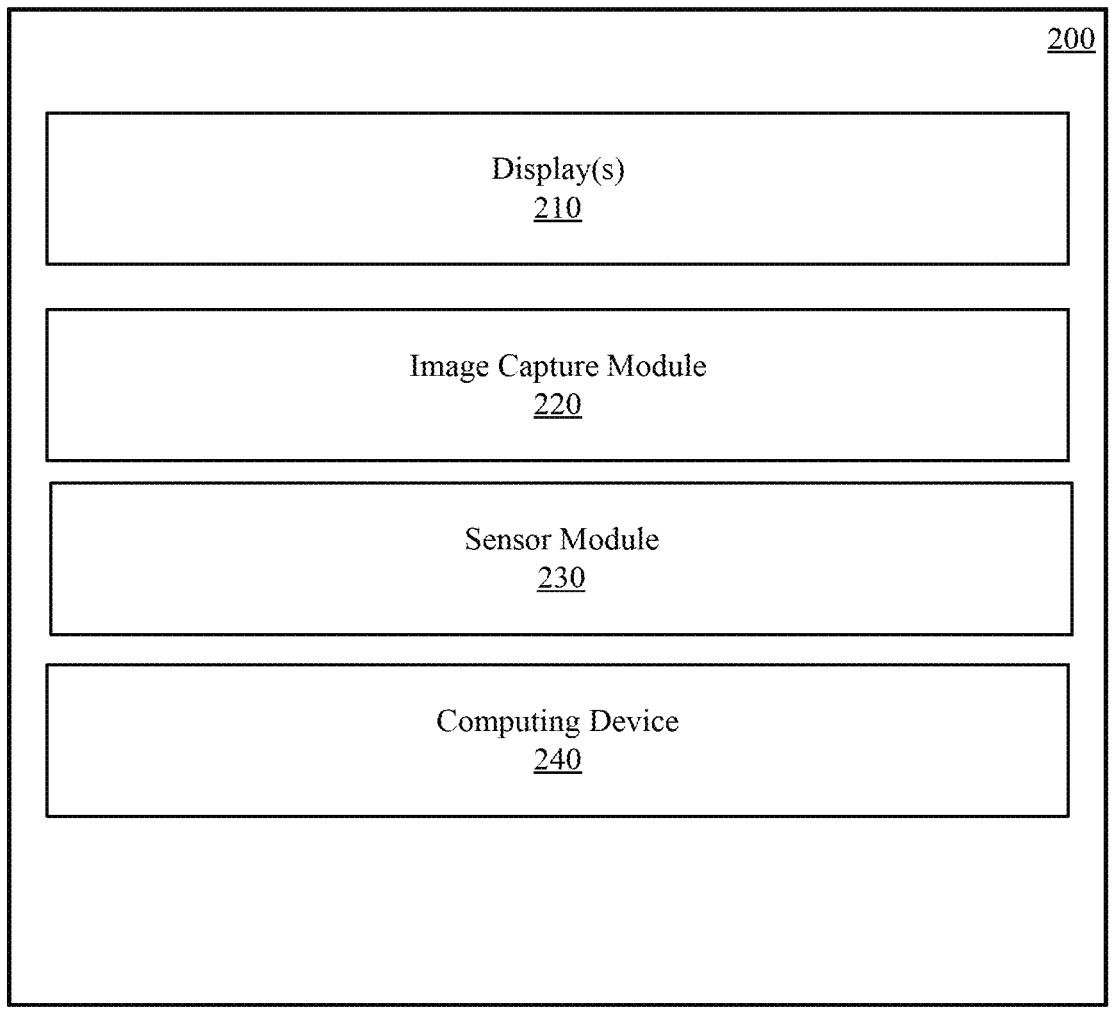
FIG. 2 is a simplified schematic diagram showing components of a computing device.

FIG. 2 is a simplified schematic diagram showing components of an exemplary computing device 200. The requesting device 110 and the mobile device 150 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
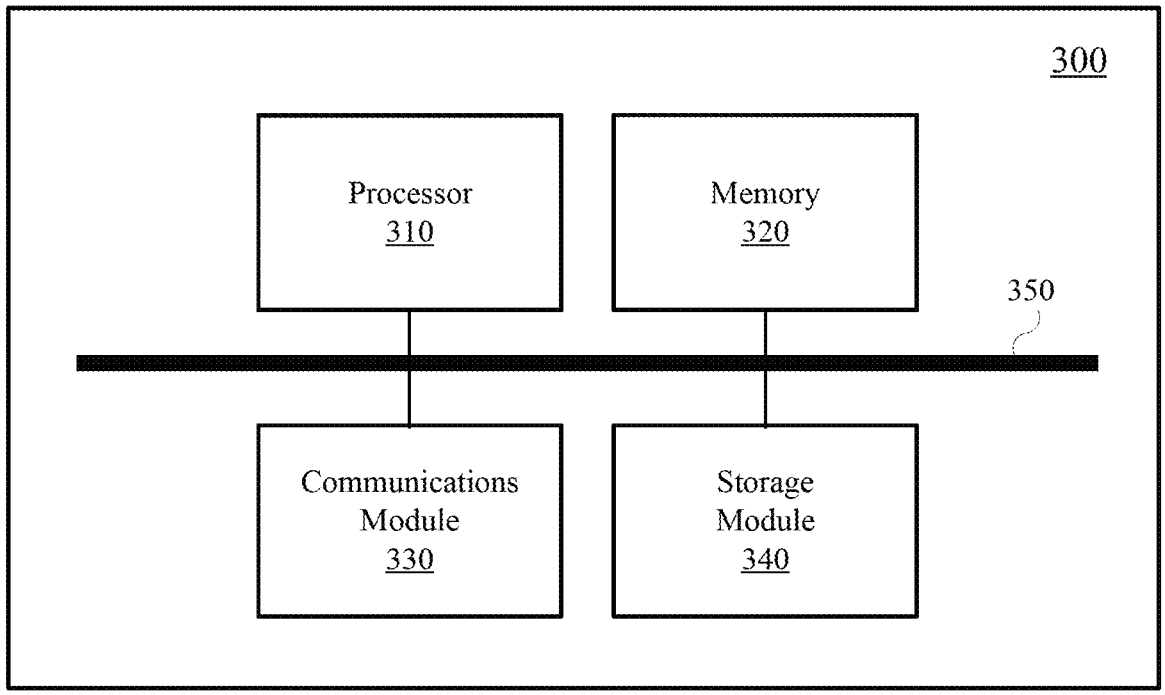
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2) and/or server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are non-transitory computer-readable storage mediums. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
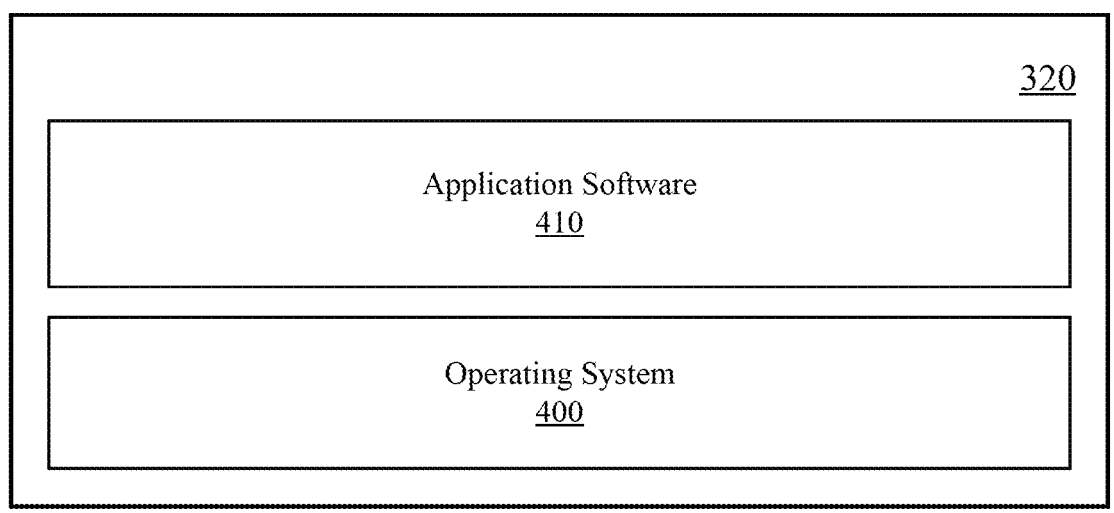
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the requesting device 110 or the mobile device 150, the applications 410 may include a stored-value card management application that may be used to purchase, configure send and/or receive a stored-value card. The stored-value card management application may be a web-based application or may be a mobile application. For example, the stored-value card management application may be accessed on the requesting device 110 via a web browser. As another example, the stored-value card management application may be downloaded onto the requesting device 110 and may be accessed thereon.

The stored-value card management application may be accessed on the mobile device 150 and may adapt the mobile device 150 to present augmented reality environments, a specialized form of virtual reality in which graphic objects in a virtual-reality environment are related to objects in a real-world scene or environment and are presented in real-time as the real-world environment is captured using an image capture module. It will be appreciated that one or more other applications may adapt the mobile device 150 to present the augmented reality environments. The requesting device 110 may similarly be adapted to present augmented reality environments.

The stored-value card management application may require a requesting party to authenticate. For example, the stored-value card management application may be installed on the requesting device 110 and may require the user of the requesting device 110 (also referred to as the requesting party) to create an account. Account creation may require the submission of credentials to be used for authentication such as for example a username and a password. The username may include the requesting party's email address.

To access the stored-value card management application on the requesting device 110, the requesting party may be prompted to enter the credentials submitted during the account creation. For example, the requesting party may be prompted to submit a username and a password associated with their account. In response to receiving the credentials, the server computer system 120 may authenticate the requesting device 110 (or user) and may identify an account associated therewith.

Within the stored-value card management application, the requesting party may purchase a stored-value card according to one or more parameters. The one or more parameters may include at least one of an amount of the stored-value card, a type of the stored-value card, etc.

In one or more embodiments, a graphical user interface may be displayed on a display screen of the requesting device 110 that may include one or more interface elements for purchasing the stored-value card and for defining the one or more parameters of the stored-value card. The one or more interface elements may include selectable interface elements and/or input fields that are to be completed by the requesting party.

As one example, the graphical user interface may include a number of selectable interface elements for defining the amount of the stored-value card. In one or more embodiments, at least some of the selectable interface elements may be associated with a particular amount such as for example $5, $10, $25, $50, $100, etc. It will be appreciated that at least one interface element may include an input field that may be completed to define a custom amount for the stored-value card.

As another example, the graphical user interface may include a number of selectable interface elements for selecting the type of the stored-value card. In one or more embodiments, at least some of the selectable interface elements may be associated with a particular type of the stored-value card such as for example a stored-value card that may only be used at a particular merchant, a stored-value card that may only be used at a particular group of merchants, a stored-value card that may be used at any merchant, etc.

Within the stored-value card management application, the requesting party may define or input a personal message for the recipient and may identify an actor to perform the personal message.

As one example, the graphical user interface may include one or more interface elements for defining the personal message for the recipient. For example, the graphical user interface may include an interface element for entering the personal message and this may be done using, for example, an input device associated with the requesting device 110.

As yet another example, the graphical user interface may include a number of selectable interface elements for selecting or identifying an actor to perform the personal message. The actors that may be selected to perform the personal message may include, for example, celebrities, athletes, cartoon characters, characters from a particular television show or movie, politicians, etc. The actors that may be selected or identified to perform the personal message may be predefined and one or more images of the actors may be stored in the database 140.

In one or more embodiments, the graphical user interface may include an interface element for identifying an actor that is not shown as one of the selectable interface elements. For example, the requesting party may wish to select a particular cartoon character that is not displayed as one of the selectable interface elements. As such, the requesting party may enter the name of the cartoon character using, for example, an input device associated with the requesting device 110. Once input, a signal may be sent from the requesting device 110 to the server computer system 120 that includes the name of the cartoon character. The server computer system 120 may engage, for example, an application programming interface (API) to obtain an image of the cartoon character and may store the image of the cartoon character in the database 140. The server computer system 120 may additionally update the database 140 to add the cartoon character to the selectable interface elements such that the cartoon character may be displayed as an option for future requests made by a requesting party.

Within the stored-value card management application, the requesting party may additionally define a gesture that is to be performed by the recipient to add the stored-value card to a mobile wallet. For example, the graphical user interface may include one or more selectable interface elements for defining a gesture that is to be performed by the recipient. The gestures may include gestures that are to be performed on a display screen of the mobile device 150 of the recipient once an augmented personal message has completed playing. Example gestures include a swipe right gesture, a swipe left gesture, a high five, a finger tap, etc.

It will be appreciated that other parameters may be defined for the stored-value card that the other parameters may be defined by the requesting party within the stored-value card management application.

The stored-value card management application may additionally require that the requesting party provide identifying information of the recipient of the stored-value card such as for example an electronic address (mobile phone number, email address, etc.) associated with the recipient and this may be used to send the stored-value card to the recipient.

The stored-value card management application may additionally include a check-out page that includes one or more interface elements for providing payment information for purchasing the stored-value card.

Responsive to completion of the purchase of the stored-value card, the server computer system 120 may perform operations to send the stored-value card to the recipient and the operations may include generating an augmented personal message and sending the augmented personal message to the mobile device of the recipient.

Figure 5:
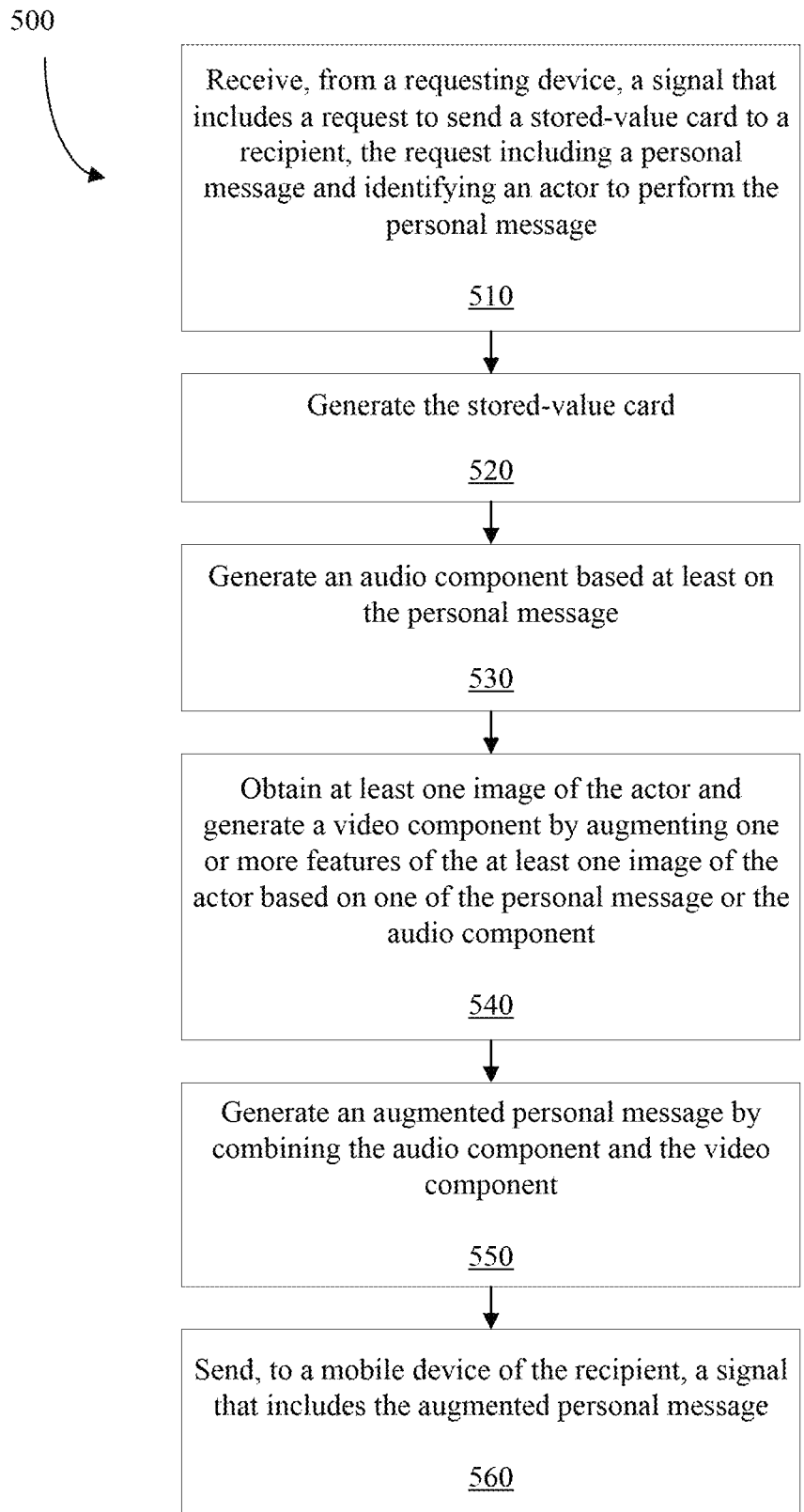
FIG. 5 is a flowchart showing operations performed by a server computer system in providing an augmented personal message according to an embodiment.

Reference is made to FIG. 5, which illustrates, in flow-chart form, a method 500 for sending an augmented personal message. The method 500 may be implemented by a computing device having suitable processor-executable instructions for causing the computing device to carry out the described operations. The method 500 may be implemented, in whole or in part, by the server computer system 120. It will be appreciated that one or more operations may be offloaded to the requesting device 110 and/or the mobile device 150.

The method 500 includes receiving, from a requesting device, a signal that includes a request to send a stored-value card to a recipient, the request including a personal message and identifying an actor to perform the personal message (step 510).

In one or more embodiments the requesting device includes the requesting device 110. The request to send the stored-value card may include one or more parameters of the stored-value card. The one or more parameters may be defined by the requesting party within the stored-value card management application in manners described herein. The one or more parameters may include an amount of the stored-value card and/or a type of the stored-value card.

The personal message may be defined by the requesting party within the stored-value card management application in manners described herein. The personal message includes a message that is to be performed by the actor. In one or more embodiments, the personal message may be in a text format.

The actor identified to perform the personal message is selected by or defined by the requesting party in manners described herein. As mentioned, the actor may be a celebrity, athlete, cartoon character, a character from a particular television show or movie, a politician, etc.

Responsive to the requesting party completing a purchase of the stored-value card, the requesting device 110 may send the signal that includes the request to send the stored-value card to the recipient to the server computer system 120. In one or more embodiments, the signal may additionally include identifying information of the recipient such as for example the electronic address (mobile phone number, email address, etc.) associated with the recipient.

The method 500 includes generating the stored-value card (step 520).

Responsive to receiving the signal that includes the request to send the stored-value card to the recipient, the server computer system 120 may generate the stored-value card and this may be done according to the one or more parameters.

In one or more embodiments, generating the stored-value card may include creating the stored-value card. For example, the server computer system may generate a unique identifier for the stored-value card. In one or more embodiments, the unique identifier may be generated using a random number generator. For example, the server computer system 120 may send a signal requesting that a random sixteen (16) digit number be generated. The server computer system 120 may receive the random sixteen (16) digit number and this may be set as the unique identifier for the stored-value card.

In one or more embodiments, the unique identifier may follow a sequence of identifiers. For example, a unique identifier may end with one or more digits and the one or more digits may be incremented by a set amount, such as for example one (1) digit, each time a new unique number is to be generated for that particular type of stored-value card. For example, a unique number may end with 0001 and the next unique number may end with 0002.

In one or more embodiments, rather than creating the stored-value card, the server computer system 120 may obtain a unique number of the stored-value card. For example, the stored-value card may be a stored-value card that may only be used at a particular merchant and as such the particular merchant may be responsible to generate the unique number of the stored-value card. In this example, the server computer system 120 may engage, for example, an application programming interface (API) associated with the particular merchant to obtain the unique number of the stored-value card.

In one or more embodiments, the stored-value card may have been previously obtained by the server computer system 120. For example, a bulk purchase of stored-value cards may have been previously completed by a financial institution associated with the server computer system 120 and as such the database 140 may store data records that include a list of unique identifiers for the purchased stored-value cards. In this example, the server computer system 120 may assign a unique identifier of one of the purchased stored-value cards to the recipient and this may be based on, for example, the amount of the stored-value card. For example, the stored-value card to be sent to the recipient may be of the amount $50 and as such the server computer system 120 may select a particular previously-purchased stored-value card that is in the amount of $50 and may assign the unique identifier of the particular previously-purchased stored-value card to the recipient.

Responsive to generating the stored-value card, the server computer system 120 may send a signal causing the database 140 to store the unique identifier of the stored-value card and/or causing the database 140 to store the one or more parameters of the stored-value card.

In one or more embodiments, generating the stored-value card may include generating or obtaining a two-dimensional image of the stored-value card that may be used to identify the stored-value card when it is stored in a mobile wallet. The two-dimensional image may include the unique identifier of the stored-value card and/or may include, for example, a machine-readable code that may be scanned by a scanning device to spend or otherwise use the stored-value card.

The method 500 includes generating an audio component based at least on the personal message (step 530).

As mentioned, the personal message may be in a text format. In one or more embodiments, the server computer system 120 may engage a text-to-speech module to convert the personal message to the audio component. For example, the personal message may include text such as "Happy Birthday" and as such the text-to-speech module may convert the text to an audio component. The audio component that is generated based on the personal message may be stored in the database 140.

In one or more embodiments, the server computer system 120 may obtain one or more pre-generated audio components from the database 140 and may use the one or more pre-generated audio components to generate the audio component. For example, the one or more pre-generated audio components may include a standard introduction or closing that may be used when generating the audio component.

Figure 6:
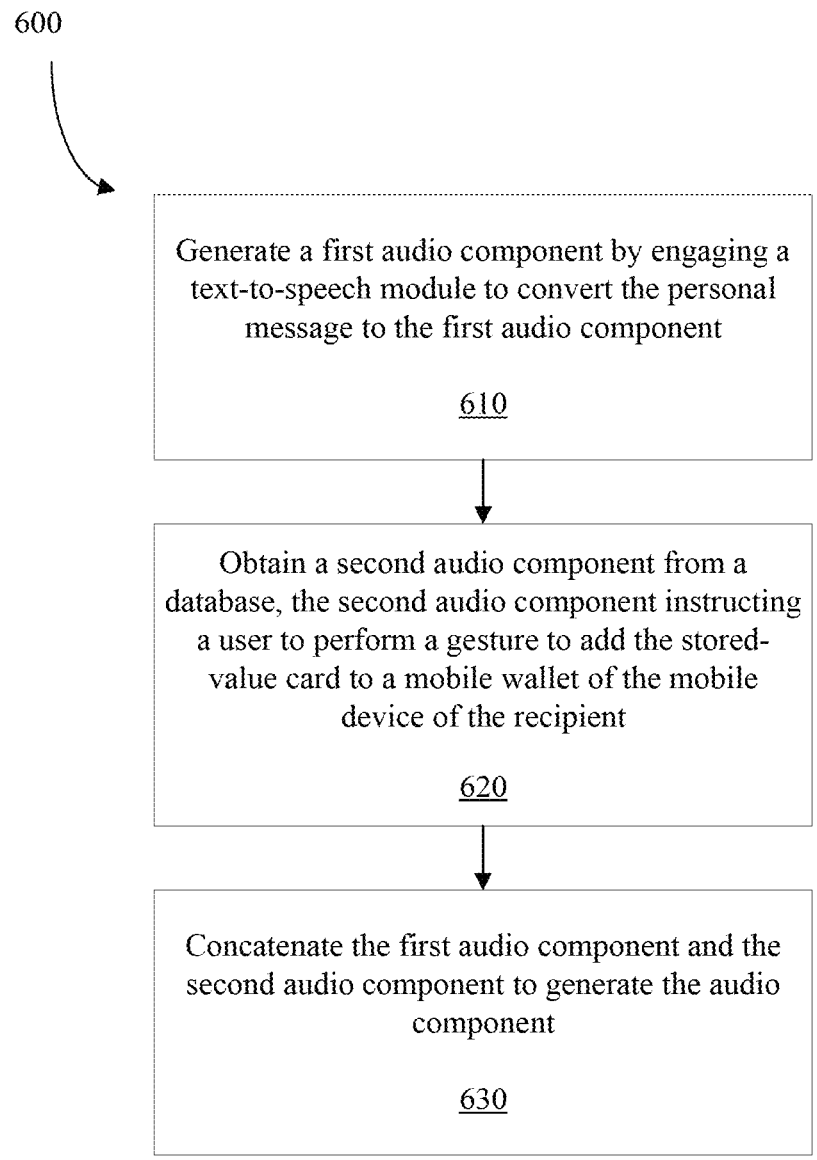
FIG. 6 is a flowchart showing operations performed by a server computer system in generating an audio component according to an embodiment.

Reference is made to FIG. 6, which illustrates, in flowchart form, a method 600 for generating the audio component. The method 600 may be implemented by a computing device having suitable processor-executable instructions for causing the computing device to carry out the described operations. The method 600 may be implemented, in whole or in part, by the server computer system 120. It will be appreciated that one or more operations may be offloaded to the requesting device 110 and/or the mobile device 150.

The method 600 includes generating a first audio component by engaging a text-to-speech module to convert the personal message to the first audio component (step 610).

As mentioned, the personal message may be in a text format. As such, the server computer system 120 may engage a text-to-speech module to convert the personal message to the first audio component.

The method 600 includes obtaining a second audio component from a database (step 620).

The second audio component may be a pre-generated audio component stored in the database 140. In one or more embodiments, the second audio component may be selected based on the actor selected to perform the personal message. For example, the actor may be a famous athlete named "John Doe" and as such the second audio component may include audio of John Doe introducing himself.

As mentioned, the requesting party may select a particular gesture that is to be performed by the recipient to accept the stored-value card. As such, in one or more embodiments, the second audio component may be selected based on what gesture is to be performed to accept the stored-value card. For example, the requesting party may have selected a high five gesture and as such the second audio component may include audio such as "to accept the digital gift card, please give me a high five."

The method 600 includes concatenating the first audio component and the second audio component to generate the audio component (step 630).

The audio component may be generated by concatenating the first audio component and the second audio component. In one or more embodiments, the first audio component may be played first and as such the audio component is generated such that the first audio component is before the second audio component. For example, the first audio component may include audio "Happy Birthday Tom" and the second audio component may include audio "to accept the digital gift card, please give me a high five." As such, the audio component may be generated to include the audio "Happy Birthday Tom. To accept the digital gift card, please give me a high five."

In one or more embodiments, the first audio component may be played second and as such the audio component is generated such that the second audio component is before the first audio component. For example, the first audio component may include audio "Happy Birthday Tom" and the second audio component may include audio "Hi, I'm John Doe." As such, the audio component may be generated to include the audio "Hi, I'm John Doe. Happy Birthday Tom."

It will be appreciated that the audio component may include a plurality of audio components concatenated together. For example, the audio component may be generated to include the audio "Hi, I'm John Doe. Happy Birthday Tom. To accept the digital gift card, please give me a high five."

It will be appreciated that other audio components may be used such as for example music (songs, etc.), quotes (such as a quote from a movie that the actor starred in), etc.

The method 500 includes obtaining at least one image of the actor and generating a video component by augmenting one or more features of the at least one image of the actor based on one of the personal message or the audio component (step 540).

The server computer system 120 obtains at least one image of the actor. For example, as mentioned, the actors that may be selected or identified to perform the personal message may be predefined and as such one or more images of the actors may be stored in the database 140. In this example, the server computer system 120 may obtain the at least one image of the actor from the database 140. As another example, as mentioned, the requesting party may identify the actor to perform the personal message by entering the name of the actor in an input field. In this example, the server computer system 120 may engage an application programming interface (API) such as a Google™ Images API to obtain at least one image of the actor. As yet another example, the stored-value card management application may include a selectable interface element for uploading an image of the actor.

Figure 7:
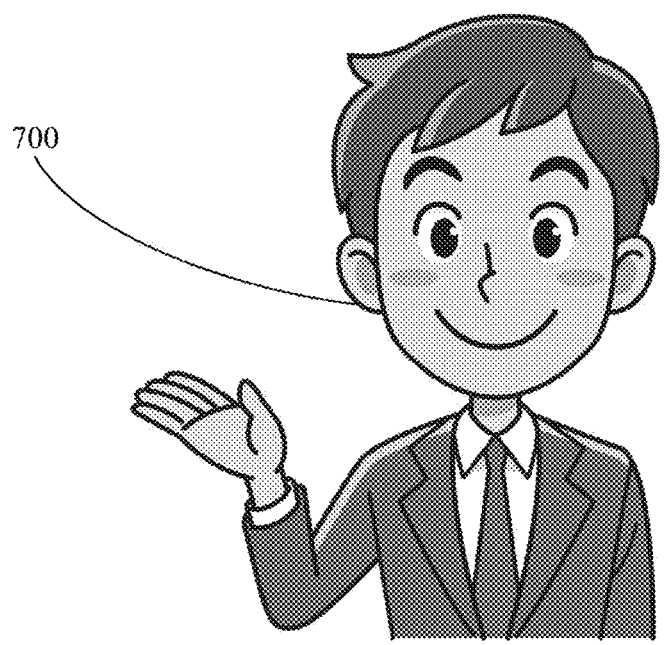
FIG. 7 is an example image of an actor according to an embodiment.

An example image 700 of an actor obtained by the server computer system 120 is shown in FIG. 7.

The server computer system 120 generates the video component by augmenting one or more features of the at least one image of the actor based on the personal message and/or the audio component. Augmenting the one or more features may include animating the one or more features.

In one or more embodiments, the features of the image that may be augmented include the eyes, mouth, and hand of the image of the actor. For example, the server computer system 120 may augment the eyes of the image of the actor to make it appear as though the actor is excited and this may be done, for example, in the event that the personal message includes an exclamation mark. As another example, the server computer system 120 may augment the mouth of the image of the actor to make it appear as though the actor is talking or saying the personal message or the audio component. As yet another example, the server computer system 120 may augment a hand of the image of the actor to make it appear as though the actor is giving a high five.

Figure 8:
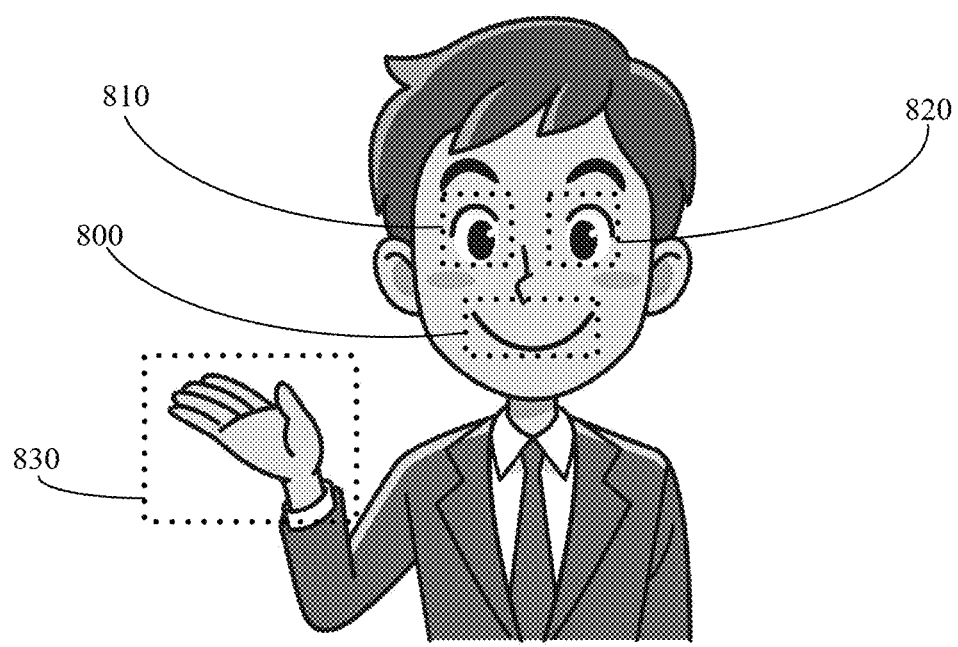
FIG. 8 show example features that may be augmented.

Example features of the image that may be augmented are shown in FIG. 8. In the example shown, the features of the image of the actor that may be augmented include the mouth 800, the right eye 810, the left eye 820 and the right hand 830.

To augment the one or more features of the image of the actor, the server computer system 120 may engage one or more animation tools such as for example Adobe™ Character Animator. In one or more embodiments, the server computer system 120 may utilize a lip-sync function available on the one or more animation tools to augment the one or more features of the image of the actor to make it appear as though the actor is performing the audio component and/or personal message.

The method 500 includes generating an augmented personal message by combining the audio component and the video component (step 550).

The server computer system 120 combines the audio component and the video component to generate the augmented personal message. The augmented personal message may be stored in, for example, the database 140 in a video format such as for example the MPEG-4 (MP4) file format.

The method 500 includes sending, to a mobile device of the recipient, a signal that includes the augmented personal message (step 560).

Figure 9:
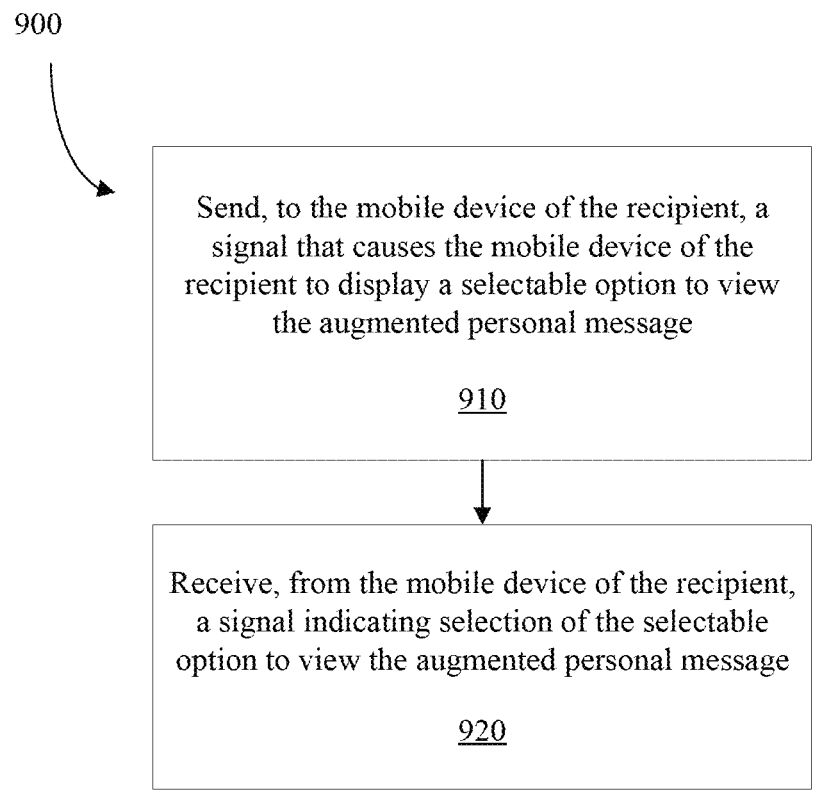
FIG. 9 is a flowchart showing operations performed by a server computer system in notifying a recipient of a stored-value card according to an embodiment.

In one or more embodiments, prior to sending the signal that includes the augmented personal message, the server computer system 120 may notify the recipient of the stored-value card. Reference is made to FIG. 9, which illustrates, in flowchart form, a method 900 for notifying the recipient of the stored-value card. The method 900 may be implemented by a computing device having suitable processor-executable instructions for causing the computing device to carry out the described operations. The method 900 may be implemented, in whole or in part, by the server computer system 120. It will be appreciated that one or more operations may be offloaded to the requesting device 110 and/or the mobile device 150.

The method 900 includes sending, to the mobile device of the recipient, a signal that causes the mobile device of the recipient to display a selectable interface element to view the augmented personal message (step 910). The mobile device of the recipient may include the mobile device 150.

In one or more embodiments, the signal may cause the mobile device of the recipient to display a notification that includes the selectable interface element to view the augmented personal message. The notification may include a message that identifies the sender of the stored-value card, the value of the stored-value card, etc. The notification may be sent as a text message, email message, etc. or may be displayed as notification within, for example, a mobile application executing on the mobile device 150.

The user or recipient may select the selectable interface element by, for example, performing a tap gesture on a display screen of the mobile device 150 and in response the mobile device 150 may send a signal to the server computer system 120.

The method 900 includes receiving, from the mobile device of the recipient, a signal indicating selection of the selectable interface element to view the augmented personal message (step 920).

The server computer system 120 receives, from the mobile device 150 of the recipient, the signal indicating selection of the selectable interface element to view the augmented personal message. In response, the server computer system 120 may send the signal that includes the augmented personal message.

The signal that includes the augmented personal message may cause the mobile device 150 of the recipient to play the augmented personal message. For example, as mentioned, the augmented personal message may be in an MP4 file format and as such the mobile device 150 may utilize an application to play the augmented personal message.

As mentioned, the mobile device 150 may be adapted to present augmented reality environments, a specialized form of virtual reality in which graphic objects in a virtual-reality environment are related to objects in a real-world scene or environment and are presented in real-time as the real-world environment is captured using an image capture module. As such, in one or more embodiments, the signal that includes the augmented personal message may cause the mobile device 150 of the recipient to play the augmented personal message in augmented reality.

To play the augmented personal message in augmented reality, the mobile device 150 may perform one or more operations. For example, the signal that includes the augmented personal message may cause the mobile device 150 to open a mobile application associated with augmented reality to capture the real-world environment using the image capture module. The real-world environment is a live view of the environment seen by the image capture module of the mobile device 150. For example, the recipient and the mobile device 150 may be located in a kitchen and as such the real-world environment captured using the image capture module and displayed on the display screen may include a live view of the kitchen.

In one or more embodiments, the user or recipient may not have previously granted permission to the mobile application to access the image capture module and as such the mobile device 150 may display a notification that includes a selectable interface element for granting permission to the mobile application to access the image capture module. Responsive to the user or recipient selecting the selectable interface element, the mobile device 150 may perform operations to capture the real-world environment using the image capture module.

Figure 10:
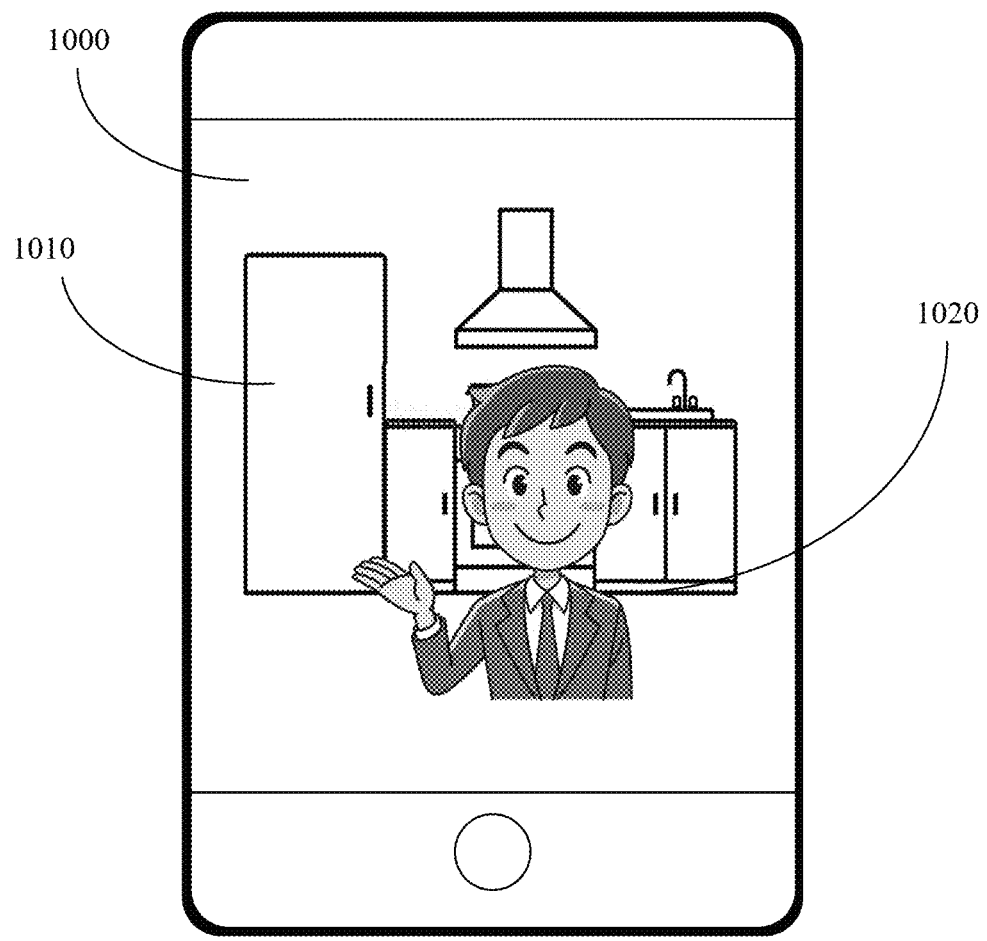
FIG. 10 is an example augmented reality displayed on a display screen of a mobile device according to an embodiment.

Responsive to receiving the signal that includes the augmented personal message, the mobile device 150 may display the augmented personal message in the augmented reality. An example augmented reality 1000 displayed on the display screen of the mobile device 150 is shown in FIG. 10. As can be seen, the augmented reality 1000 includes the real-world environment 1010 (which in this example is a kitchen) and the augmented personal message 1020. As shown, the actor performing the augmented personal message appears to be located in the real-world environment 1010.

Figure 11:
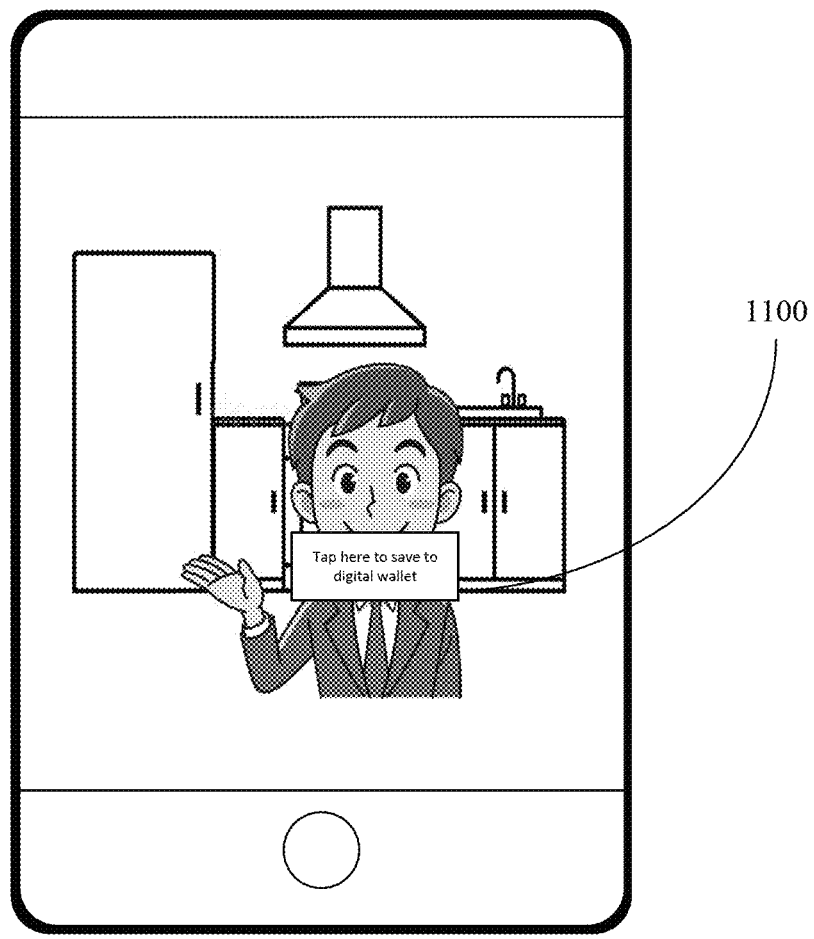
FIG. 11 is another example augmented reality displayed on a display screen of a mobile device that includes a selectable interface element for adding a stored-value card to a mobile wallet according to an embodiment.

In one or more embodiments, the augmented personal message may include a selectable interface element to add the stored-value card to a mobile wallet. An example is shown in FIG. 11. As can be seen, a selectable interface element 1100 is displayed on the display screen of the mobile device 150. In this example, the selectable interface element 1100 is displayed on the display screen of the mobile device 150 after the augmented personal message has completed playing on the mobile device 150 within the augmented reality. The user may select the selectable interface element 1100 by performing a tap gesture on the display screen of the mobile device 150 at a location that corresponds to the location of the selectable interface element 1100 and in response, the mobile device 150 and/or the server computer system 120 may perform operations to store the stored-value card in a mobile wallet of the mobile device 150 of the recipient. The stored-value card may be stored in the mobile wallet in a two-dimensional format.

In one or more embodiments, rather than displaying a selectable interface element to add the stored-value card to a mobile wallet (as shown in FIG. 11), the user may be required to perform a particular gesture to add the stored-value card to the mobile wallet. For example, as mentioned previously, the requesting party may select a gesture that is to be performed on a display screen of the mobile device 150 of the recipient once the augmented personal message has completed playing. For example, the requesting party may request that the recipient perform a high five (or a tap) gesture at a location on the display screen of the mobile device 150 that corresponds to a location of the actor's hand. In this example, the augmented personal message may include video and audio of the actor requesting that the user perform the high five gesture. For example, the augmented personal message may include video and audio making it appear as though the actor is saying "To accept the digital gift card, please give me a high five." In response to performance of the gesture, the server computer system 120 and/or the mobile device 150 may perform operations to add the stored-value card to the mobile wallet. It is noted that the size of the display screen of the mobile device 150 may be smaller than a hand of the recipient and as such a high five gesture may be performed by the recipient by performing a tap gesture. Put another way, to high five the actor, the recipient may perform a tap gesture with a finger at a location that corresponds to the hand of the actor.

Figure 12:
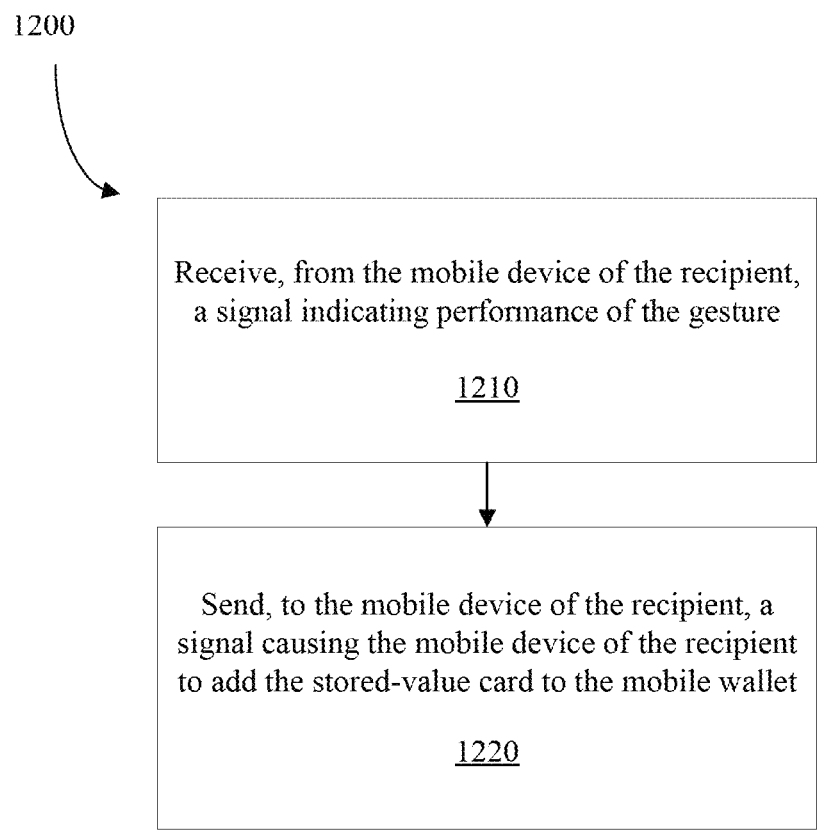
FIG. 12 is a flowchart showing operations performed by a server computer system in adding a stored-value card to a mobile wallet according to an embodiment.

FIG. 12 is a flowchart showing operations performed by the server computer system 120 in adding the stored-value card to a mobile wallet according to an embodiment. The operations may be included in a method 1200 which may be performed by the server computer system 120. For example, computer-executable instructions stored in memory of the server computer system 120 may, when executed by one or more processors, configure the server computer system 120 to perform the method 1200 or a portion thereof. It will be appreciated that one or more operations may be offloaded to the mobile device 150.

The method 1200 includes receiving, from the mobile device of the recipient, a signal indicating performance of the gesture (step 1210).

As mentioned, the gesture may include a tap gesture, a high five gesture, a swipe left gesture, a swipe right gesture, etc. In response to performance of the gesture on the display screen of the mobile device 150, the mobile device 150 may send a signal to the server computer system 120 indicating performance of the gesture.

The method 1200 includes sending, to the mobile device of the recipient, a signal causing the mobile device of the recipient to add the stored-value card to the mobile wallet (step 1220).

The server computer system 120 may obtain the previously generated two-dimensional image of the stored-value card and may include the two-dimensional image of the stored-value card with the signal. The signal causes the mobile device 150 of the recipient to store the stored-value card to the mobile wallet.

In one or more embodiments, within the mobile wallet, the stored-value card may include a selectable interface element to view the augmented personal message. In response to selection of the selectable interface element to view the augmented personal message, the mobile device 150 and/or the server computer system 120 may perform operations to place the augmented personal message in the augmented reality in manners similar to that described herein.

Figure 13:
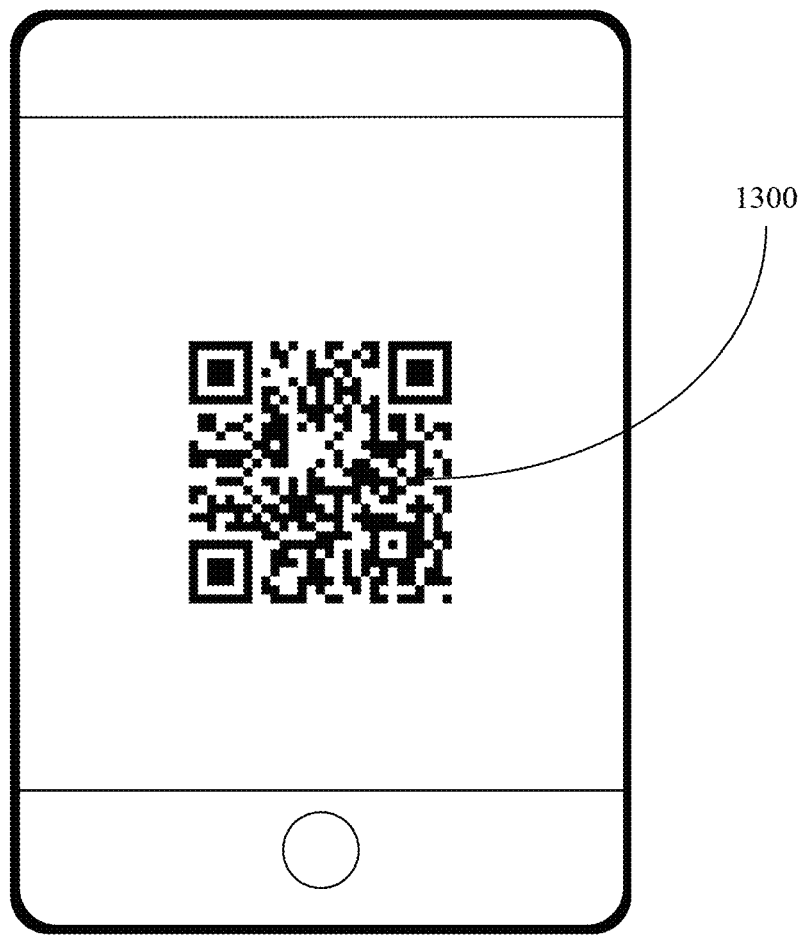
FIG. 13 is an example machine-readable code displayed on a display screen of a mobile device according to an embodiment.

In one or more embodiments, within the mobile wallet, the stored-value card may include a selectable interface element to display a machine-readable code. Similarly, the augmented personal message may include a selectable interface element to display a machine-readable code. For example, the user may perform a tap gesture on the display screen of the mobile device 150 at a location that corresponds to the location of the selectable interface element within the augmented reality and in response, a machine-readable code may be displayed on a display screen of the mobile device 150. An example machine-readable code 1300 is shown in FIG. 13. In this example, the machine-readable code 1300 may include a quick-response (QR) code that may be scanned or otherwise read by a scanning device. The machine-readable code 1300 may be used to redeem, spend or use the stored-value card.

Figure 14:
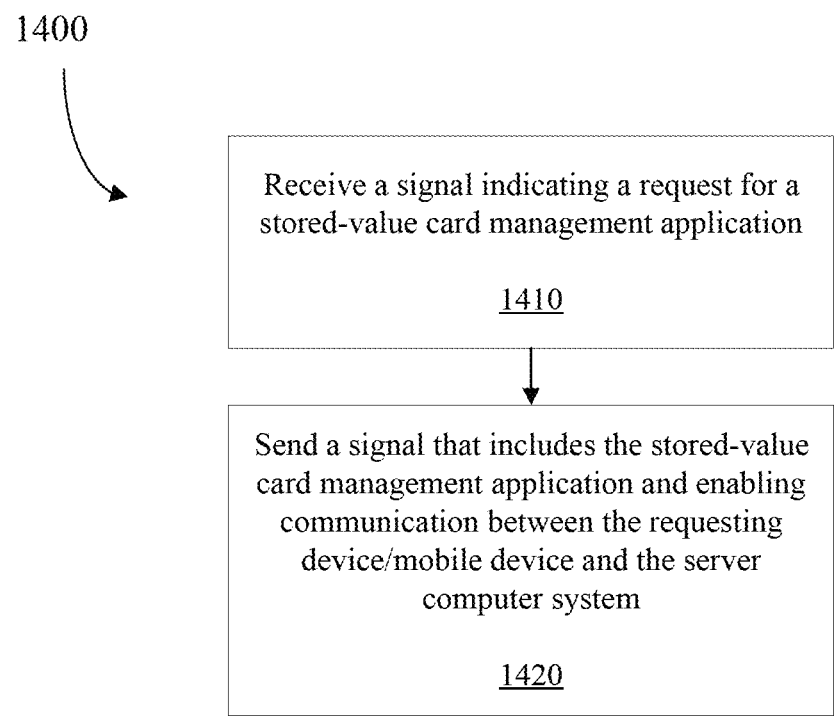
FIG. 14 is a flowchart showing operations performed by a server computer system in providing a stored-value card management application according to an embodiment.

As mentioned, the server computer system 120 may provide a stored-value card management application to the requesting device 110 and/or the mobile device 150. FIG. 14 is a flowchart showing operations performed by the server computer system 120 in providing the stored-value card management application to the requesting device 110 and/or the mobile device 150 according to an embodiment. The operations may be included in a method 1400 which may be performed by the server computer system 120. For example, computer-executable instructions stored in memory of the server computer system 120 may, when executed by one or more processors, configure the server computer system 120 to perform the method 1400 or a portion thereof.

The method 1400 includes receiving, from the requesting device 110 and/or the mobile device 150, a signal indicating a request for the stored-value card management application (step 1610).

In one or more embodiments, the user or recipient may visit a mobile application store on the requesting device 110 and/or the mobile device 150 and may select a selectable interface element to download the stored-value card management application. In response to the user selecting the selectable interface element, the requesting device 110 and/or the mobile device 150 may send a signal to the server computer system 120 indicating a request for the stored-value card management application.

The method 1400 includes sending, to the requesting device 110 and/or the mobile device 150, a signal that includes the stored-value card management application and enabling communication between the requesting device 110 and/or the mobile device 150 and the server computer system 120 (step 1420). The requesting device 110 and/or the mobile device 150 store the stored-value card management application in memory. The stored-value card management application may remain in memory of the requesting device 110 and/or the mobile device 150 until it is uninstalled or removed by the user or recipient. The stored-value card management application allows or enables communication between the requesting device 110 and/or the mobile device 150 and the server computer system 120.

Although in one or more embodiments described herein, the requesting party is required to select an actor to perform the augmented personal message, it will be appreciated that alternatives are available. For example, rather than selecting an actor, the requesting party itself may wish to perform the augmented personal message. In this example, the requesting party may be provided with a selectable interface element to upload a picture of themselves and/or may be provided with a selectable interface element for recording the audio component that is to be used with the augmented personal message. The server computer system 120 may generate the augmented personal message similar to manners described herein such that it appears as though the requesting party is performing the personal message.

Although in one or more embodiments described herein, the augmented personal message is described as including a selectable interface element to add the stored-value card to a mobile wallet, it will be appreciated that the augmented personal message may include additional or alternative selectable interface elements. For example, the recipient may wish to share the augmented personal message with one or more other recipients. As such, the augmented personal message may include a selectable interface element for sending the augmented personal message to one or more other recipients. It will be appreciated that the recipient may wish to share the augmented personal message and not the stored-value card with the one or more other recipients and as such the augmented personal message may be sent to the one or more other recipients without an option to accept the stored-value card.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A computer server system comprising:
   a communications module;
   a processor coupled with the communications module; and
   a memory coupled to the processor and storing processor-executable instructions which, when executed by the processor, configure the processor to:
   receive, via the communications module and from a requesting device, a signal that includes a request to send a stored-value card to a recipient, the request including a personal message defined in a text format and identifying an actor to perform the personal message;

generate an audio component based at least on the personal message;

obtain at least one image of the actor and generate a video component by augmenting one or more features of the at least one image of the actor based on one of the personal message or the audio component;

generate an augmented personal message by combining the audio component and the video component;

send, via the communications module and to a mobile device of the recipient, a signal that includes the augmented personal message, the augmented personal message including a selectable interface element to add the stored-value card to a mobile wallet that is displayed after the augmented personal message has completed playing on the mobile device of the recipient;

receive, via the communications module and from the mobile device of the recipient, a signal indicating selection of the selectable interface element; and in response to receiving the signal indicating selection of the selectable interface element, store the stored-value card in a mobile wallet of the mobile device of the recipient.

2. The computer server system of claim 1, wherein the instructions, when executed by the processor, further configure the processor to:

send, via the communications module and to the mobile device of the recipient, a signal that causes the mobile device of the recipient to display a selectable interface element to view the augmented personal message; and receive, via the communications module and from the mobile device of the recipient, a signal indicating selection of the selectable interface element to view the augmented personal message.

3. The computer server system of claim 1, wherein the signal that includes the augmented personal message causes the mobile device of the recipient to play the augmented personal message in augmented reality.

4. The computer server system of claim 3, wherein the instructions, when executed by the processor, further configure the processor to:

send, via the communications module and to the mobile device of the recipient, a signal that causes the mobile device to open an image capture module to capture real-time images of a real-world environment, wherein the augmented reality includes the real-time images of the real-world environment and the augmented personal message.

5. The computer server system of claim 1, wherein within the mobile wallet, the stored-value card includes a selectable interface element to view the augmented personal message.

6. The computer server system of claim 1, wherein the instructions, when executed by the processor, further configure the processor to:

send, via the communications module and to the requesting device, a signal that causes the requesting device to display a plurality of selectable interface elements, each selectable interface element associated with a particular actor to perform the personal message.

7. The computer server system of claim 1, wherein when generating the audio component the instructions, when executed by the processor, further configure the processor to:

engage a text-to-speech module to convert the personal message to the audio component.

8. The computer server system of claim 1, wherein when generating the audio component based at least on the personal message, the instructions, when executed by the processor, further configure the processor to:

generate a first audio component by engaging a text-to-speech module to convert the personal message to the first audio component;

obtain a second audio component from a database, the second audio component instructing a user to perform a gesture to add the stored-value card to a mobile wallet of the mobile device of the recipient; and concatenate the first audio component and the second audio component to generate the audio component.

9. The computer server system of claim 8, wherein the instructions, when executed by the processor, further configure the processor to:

receive, via the communications module and from the mobile device of the recipient, a signal indicating performance of the gesture; and in response to receiving the signal indicating performance of the gesture, send, via the communications module and to the mobile device of the recipient, a signal causing the mobile device of the recipient to add the stored-value card to the mobile wallet thereof.

10. The computer server system of claim 1, wherein within the mobile wallet, the stored-value card includes a selectable interface element to view the augmented personal message.

11. The computer server system of claim 1, wherein the video component is generated using at least one of image processing or one or more animation tools.

12. A computer-implemented method comprising:

receiving, via a communications module and from a requesting device, a signal that includes a request to send a stored-value card to a recipient, the request including a personal message defined in a text format and identifying an actor to perform the personal message;

generating an audio component based at least on the personal message;

obtaining at least one image of the actor and generating a video component by augmenting one or more features of the at least one image of the actor based on one of the personal message or the audio component;

generating an augmented personal message by combining the audio component and the video component;

sending, via the communications module and to a mobile device of the recipient, a signal that includes the augmented personal message, the augmented personal message including a selectable interface element to add the stored-value card to a mobile wallet that is displayed after the augmented personal message has completed playing on the mobile device of the recipient;

receiving, via the communications module and from the mobile device of the recipient, a signal indicating selection of the selectable interface element; and in response to receiving the signal indicating selection of the selectable interface element, storing the stored-value card in a mobile wallet of the mobile device of the recipient.

13. The computer-implemented method of claim 12, further comprising:

sending, via the communications module and to the mobile device of the recipient, a signal that causes the mobile device of the recipient to display a selectable interface element to view the augmented personal message; and receiving, via the communications module and from the mobile device of the recipient, a signal indicating selection of the selectable interface element to view the augmented personal message.

14. The computer-implemented method of claim 12, wherein the signal that includes the augmented personal message causes the mobile device of the recipient to play the augmented personal message in augmented reality.

15. The computer-implemented method of claim 14, further comprising:

sending, via the communications module and to the mobile device of the recipient, a signal that causes the mobile device to open an image capture module to capture real-time images of a real-world environment, wherein the augmented reality includes the real-time images of the real-world environment and the augmented personal message.

16. The computer-implemented method of claim 12, wherein generating the audio component based at least on the personal message comprises:

generating a first audio component by engaging a text-to-speech module to convert the personal message to the first audio component;

obtaining a second audio component from a database, the second audio component instructing a user to perform a gesture to add the stored-value card to a mobile wallet of the mobile device of the recipient; and concatenating the first audio component and the second audio component to generate the audio component.

17. The computer-implemented method of claim 16, further comprising:

receiving, via the communications module and from the mobile device of the recipient, a signal indicating performance of the gesture; and in response to receiving the signal indicating performance of the gesture, sending, via the communications module and to the mobile device of the recipient, a signal causing the mobile device of the recipient to add the stored-value card to the mobile wallet thereof.

18. The computer-implemented method of claim 12, wherein within the mobile wallet, the stored-value card includes a selectable interface element to view the augmented personal message.

19. A non-transitory computer readable storage medium comprising computer-executable instructions which, when executed, configure a processor to:

receive, via a communications module and from a requesting device, a signal that includes a request to send a stored-value card to a recipient, the request including a personal message defined in a text format and identifying an actor to perform the personal message;

generate an audio component based at least on the personal message;

obtain at least one image of the actor and generate a video component by augmenting one or more features of the at least one image of the actor based on one of the personal message or the audio component;

generate an augmented personal message by combining the audio component and the video component;

send, via the communications module and to a mobile device of the recipient, a signal that includes the augmented personal message, the augmented personal message including a selectable interface element to add the stored-value card to a mobile wallet that is displayed after the augmented personal message has completed playing on the mobile device of the recipient;

receive, via the communications module and from the mobile device of the recipient, a signal indicating selection of the selectable interface element; and in response to receiving the signal indicating selection of the selectable interface element, store the stored-value card in a mobile wallet of the mobile device of the recipient.

* * * * *